United States Patent
Hirakawa et al.

(10) Patent No.: US 9,963,024 B2
(45) Date of Patent: May 8, 2018

(54) REAR VEHICLE-BODY STRUCTURE OF AUTOMOTIVE VEHICLE WITH STORING-TYPE ROOF

(71) Applicant: MAZDA MOTOR CORPORATION, Hiroshima (JP)

(72) Inventors: Taichi Hirakawa, Hiroshima (JP); Kazutaka Ishikura, Onomichi (JP); Masaki Oda, Hiroshima (JP); Takashi Niseki, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 0 days. days.

(21) Appl. No.: 15/454,347

(22) Filed: Mar. 9, 2017

(65) Prior Publication Data

US 2017/0267083 A1 Sep. 21, 2017

(30) Foreign Application Priority Data

Mar. 18, 2016 (JP) .................................. 2016-054762

(51) Int. Cl.
*B60J 7/14* (2006.01)
*B60J 7/20* (2006.01)
*B62D 25/08* (2006.01)

(52) U.S. Cl.
CPC ............... *B60J 7/202* (2013.01); *B60J 7/143* (2013.01); *B62D 25/08* (2013.01)

(58) Field of Classification Search
CPC ... B60J 7/143; B60J 7/145; B60J 7/202; B60J 7/205; B62D 25/08; B62D 25/087; B62D 25/088; B62D 25/10; B60R 2021/0011

USPC ...................................................... 296/107.08
See application file for complete search history.

(56) References Cited

U.S. PATENT DOCUMENTS

| | | | |
|---|---|---|---|
| 2006/0097542 A1* | 5/2006 | Dilluvio | B60J 7/0069 296/107.09 |
| 2010/0019531 A1* | 1/2010 | Noda | B60J 7/205 296/107.07 |
| 2010/0201150 A1* | 8/2010 | Kinnanen | B60J 7/205 296/107.08 |
| 2013/0038084 A1* | 2/2013 | Kinnanen | B60J 7/146 296/107.17 |
| 2014/0292019 A1* | 10/2014 | Ugolini | B60J 7/146 296/107.07 |

(Continued)

FOREIGN PATENT DOCUMENTS

| | | |
|---|---|---|
| JP | H2-82624 U | 6/1990 |
| JP | 2003-011674 A | 1/2003 |

(Continued)

*Primary Examiner* — Gregory A Blankenship
(74) *Attorney, Agent, or Firm* — Studebaker & Brackett PC

(57) ABSTRACT

A deck cover is openably provided at a vehicle-body rear portion positioned in back of a cabin. A top portion of a rear wheelhouse is provided at the vehicle-body rear portion. This top portion is configured to be displaced upward, relative to a vehicle-body rear end portion, such as a rear bumper or a rear end panel, by vehicle-body deformation caused by a vehicle rear collision. The deck cover is supported at a position of the vehicle-body rear portion which is located vertically above or in front of the top portion of the rear wheelhouse such that the deck cover is elevated in accordance with upward displacement of the top portion when the vehicle-body rear portion receives a rear-collision load.

14 Claims, 8 Drawing Sheets

(56) References Cited

U.S. PATENT DOCUMENTS

| | | | |
|---|---|---|---|
| 2016/0089965 A1* | 3/2016 | Matsumoto | B60J 7/202 296/37.5 |
| 2016/0089966 A1* | 3/2016 | Matsumoto | B60J 7/146 296/107.08 |
| 2016/0185197 A1* | 6/2016 | Ueoka | B60J 7/20 296/107.08 |
| 2016/0236559 A1* | 8/2016 | Senoo | B60J 7/202 |
| 2017/0267080 A1* | 9/2017 | Matsumoto | B60J 1/1823 |
| 2017/0267083 A1* | 9/2017 | Hirakawa | B60J 7/202 |
| 2017/0267088 A1* | 9/2017 | Shinohara | B60J 10/21 |
| 2018/0001752 A1* | 1/2018 | Saka | B60J 7/223 |

FOREIGN PATENT DOCUMENTS

| | | |
|---|---|---|
| JP | 2006-321278 A | 11/2006 |
| JP | 2012-101770 A | 5/2012 |

\* cited by examiner

REAR VEHICLE-BODY STRUCTURE OF AUTOMOTIVE VEHICLE WITH STORING-TYPE ROOF

BACKGROUND OF THE INVENTION

The present invention relates to a rear vehicle-body structure of an automotive vehicle with a storing-type roof, in which a rear openable body, such as a deck cover to open or close an upper side of a roof storing compartment or a rear roof to open or close an upper side of a cabin, is provided at a vehicle-body rear portion.

A structure in which an opening/closing device (20) to openably move a lid member (15) as the deck cover is provided at the vehicle-body rear portion is known as the above-described rear vehicle-body structure of an automotive vehicle with a storing-type roof as disclosed in Japanese Patent Laid-Open Publication No. 2003-11674, for example.

The opening/closing device (20) of the above-described patent document comprises a drive mechanism (30), a drive arm (41) which is made to swing by the drive mechanism (30), and a link member (46) which is connected to a lower portion of the lid member (15) and a free end of the drive arm (41).

Herein, when a collision object hits against the automotive vehicle from behind in a vehicle rear collision, a vehicle-body component, such as a rear wheelhouse, which is provided at the vehicle-body rear portion, for example, is deformed upward relative to a vehicle-body rear end portion, such as a rear bumper, by being compressed by the collision object. That is, the vehicle-body rear portion of the many vehicles is provided with an upward-displacement portion which is configured to be displaced upward when the vehicle-body rear portion is deformed in the vehicle rear collision, like a top portion (an upper end) of the rear wheelhouse. For example, a portion which is positioned in back of the top portion of the rear wheelhouse is displaced such that a rearward side thereof lowers relative to a forward side thereof in accordance with upward displacement of the upward-displacement portion of the top portion in the vehicle rear collision.

The drive mechanism (30) provided at the opening/closing device (20) of the above-described patent document is provided in back of the top portion (the upward-displacement portion) of the rear wheelhouse, and the lid member (15) is supported at the opening/closing device (20) (see FIG. 2 in the patent document).

Accordingly, when the top portion of the rear wheelhouse is displaced upward as the rear wheelhouse is deformed in a ridge-folding shape in the vehicle rear collision, for example, the lid member (15) which is supported at a position located in back of the top portion via the opening/closing device (20) tends to have a specified position in which its rearward side lowers relative to its forward side. That is, there is a concern that the lid member (15) may tend to be displaced such that it directly interferes with the collision object which comes in from a vehicle rearward side in the vehicle rear collision.

If the lid member (15) collides with the collision object in the vehicle rear collision, the lid member (15) may get broken or detached from the vehicle body. Accordingly, in a case where the lid member (15) is made large-sized by expanding its rear part rearward or by arranging it closely to the vehicle-body rear end, some countermeasures may be needed.

Herein, while a support structure in which the rear openable body is support at a higher level may be considered as such countermeasures of preventing interference of the lid member (15) with the collision object in the vehicle rear collision, there is a concern that the rear openable body may become unstable because the gravity enter of the rear openable body becomes higher. Further, while component parts of the rear openable body, such as the link member (46), are required to be reinforced for securing the support rigidity sufficient enough to support the rear openable body at the higher level, there is a problem that the opening/closing device (20) may become improperly heavy and/or large-sized.

In particular, for a certain type of automotive vehicle with a storing-type roof which requires high sportiveness or preference by decreasing the aerodynamic resistance or lowering the vehicle height, the large-sized rear openable body may improperly increase a risk of its direct interference with the collision object in the vehicle rear collision. Meanwhile, if the rear openable body is supported at the higher level by the link member for avoiding the above-described interference with the collision object in the vehicle rear collision, the support burden of the link member increases, so the countermeasures for the above-described problem may be further needed.

The inventors of the present invention paid attention to a manner of deformation of the vehicle-body rear portion in the vehicle collision, and realized to elevate the rear openable body by utilizing the upward-displacement portion which is provided at the vehicle-body rear portion to be displaced upward.

In the case of the opening/closing device (20) of the above-described patent document, however, the lid member (15) is supported by the link member (46) expanding upward even in its closed position, so that there is a concern that the link member (46) may be improperly rotated downward in its rotational range by an impact of the deformation of the rear wheelhouse in the vehicle rear collision.

Since the push-up energy which the opening/closing device (20) receives from the rear wheelhouse is absorbed by the above-described rotation of the link member (46), there is a concern that the lid member (15) may not be elevated sufficiently in the vehicle rear collision, so that the lid member (15) may interfere with the collision object coming in from the vehicle rearward side. Accordingly, the problem of the vehicle body becoming heavy and/or large-sized despite reinforcing the link member or the like may happen, so that further countermeasures may be required.

SUMMARY OF THE INVENTION

Accordingly, an object of the present invention is to provide the rear vehicle-body structure of the automotive vehicle with the storing-type roof which can prevent the direct interference of the rear openable body with the collision object with a simpler structure.

The present invention is a rear vehicle-body structure of an automotive vehicle with a storing-type roof, comprising a rear openable body openably provided at a vehicle-body rear portion positioned in back of a cabin, and an upward-displacement portion provided at the vehicle-body rear portion, the upward-displacement portion being configured to be displaced upward, relative to a vehicle-body rear end portion, by vehicle-body deformation caused by a vehicle rear collision, wherein the rear openable body is supported at a position of the vehicle-body rear portion which is located vertically above or in front of the upward-displacement portion such that the rear openable body is elevated in accordance with upward displacement of the upward-displacement portion when the vehicle-body rear portion receives a rear-collision load.

According to the present invention, the direct interference of the rear openable body with the collision object can be prevented with a simple structure.

The above-described upward-displacement portion is a portion of the vehicle-body rear portion which is deformed upward due to the vehicle rear collision, for example, this upward-displacement portion can be determined based on results of a simulation or a collision test for checking a manner of deformation of the vehicle-body rear portion. Alternatively, other determining methods may be applied, such as a method that a support portion itself of the rear openable body is designed to be easily displaced upward when receiving the rear-collision load, for example, the support portion is formed in a bent shape or a trapezoid shape in a side view, or the support portion includes an upward-bending promotion portion, such as an upward-recessed bead.

An embodiment of the present invention, the upward-displacement portion is configured as a top portion of an easily-upward-bending portion, and the rear openable body is supported at a portion which is located in front of the top portion of the upward-easily-bending portion.

According to this embodiment, the rear openable body is made to slant in such a manner that its rear end is elevated relative to its front end, so that the collision object can be avoided more easily.

In another embodiment of the present invention, the upward-displacement portion is configured as a top portion of a wheelhouse.

According to this embodiment, the rear openable body is elevated by simply utilizing the wheelhouse which is an existing vehicle-body structure, so that the collision object can be avoided more easily.

In another embodiment of the present invention, a link mechanism to openably support the rear openable body at the vehicle-body rear portion is provided, and the link mechanism has a bending promotion portion to promote the upward displacement of the upward-displacement portion at a base portion thereof.

According to this embodiment, the bending promotion portion which the link mechanism has at its base portion becomes a bending starting point of the link mechanism when the vehicle-body rear portion is deformed due to the vehicle rear collision, so that the upward displacement of the upward-displacement portion can be further promoted. Thereby, the load to elevate the rear openable body by means of the link mechanism can be further increased.

In another embodiment of the present invention, a link mechanism to openably support the rear openable body at the vehicle-body rear portion is provided, and the link mechanism has an easily-bending deformation portion to promote bending deformation for a longitudinal load.

According to this embodiment, forward displacement of the rear openable body or link break caused by the interference with the collision object can be suppressed, so that the rear openable body can be elevated smoothly.

In another embodiment of the present invention, a link mechanism to openably support the rear openable body at the vehicle-body rear portion is provided, and the link mechanism is configured to support the rear openable body which is positioned in a closed state at or in the vicinity of a lower limit position in a structurally-operational range of the link mechanism.

According to this embodiment, the rear openable body can be securely elevated regardless of the support rigidity of the rear openable body at a middle position in the operational range of the link mechanism, so that the collision object can be avoided properly.

Herein, it is preferable that the above-described rear openable body be provided to be elevated as a whole when being opened. Thereby, the above-described effect of the present invention that the direct interference of the rear openable body with the collision object is prevented can be obtained properly.

Other features, aspects, and advantages of the present invention will become apparent from the following description which refers to the accompanying drawings.

DETAILED DESCRIPTION OF THE INVENTION

Figure 1A:
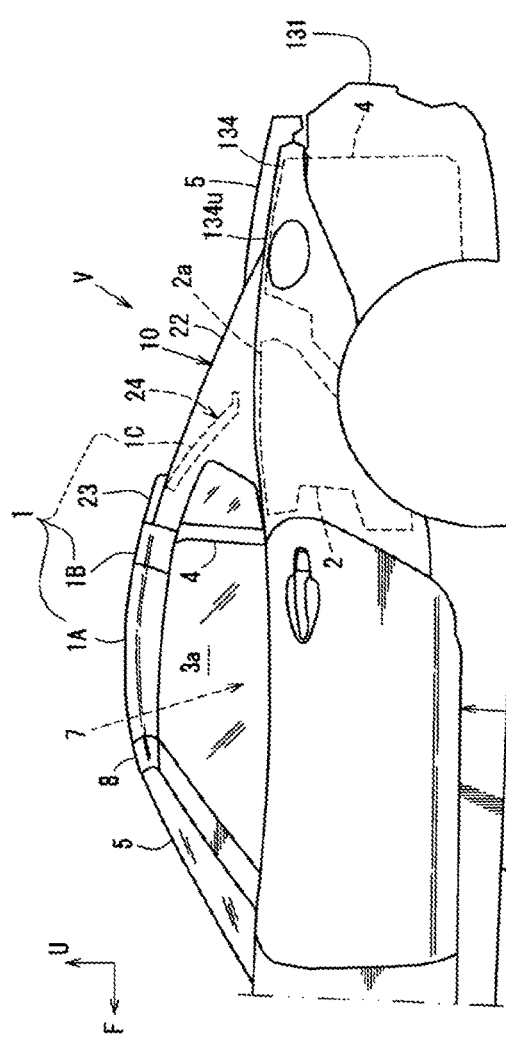
FIGS. 1A and 1B are side views showing two states of an automotive vehicle provided with a rear vehicle-body structure of the present embodiment, in which an openable roof is positioned in a closed state and in an open state.

An embodiment of the present invention will be described specifically referring to the drawings. Herein, in the figures, an arrow F shows a vehicle forward side, an arrow IN shows an inward side in a vehicle width direction, an arrow OUT shows an outward side in the vehicle width direction, and an arrow U shows a vehicle upward side.

Figure 1B:
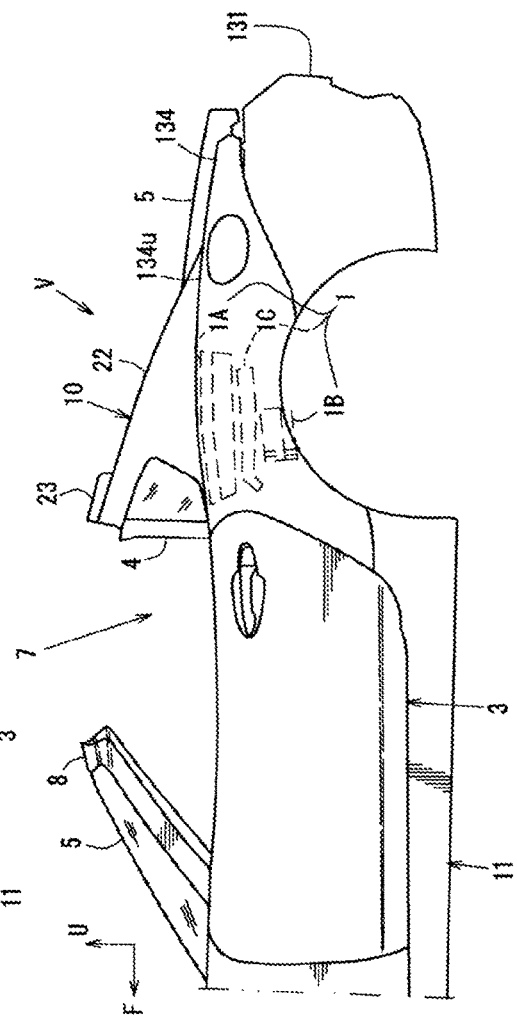

The drawings show a vehicle-body structure of an open car V of the present embodiment, and FIG. 1A is a side view in a state where an openable roof is positioned in a closed state and FIG. 1B is a side view in a state where the openable roof is positioned in an open state.

The open car V of the present embodiment comprises, as shown in FIGS. 1A and 1B, a vehicle-body main body 11 where a cabin 7 provided with a driver's seat and a passenger (assistant driver's) seat which are seats (not illustrated) where passengers are seated is partitioned. The open car V is configured to selectively take a roof-closed state (see FIG. 1A) where an openable roof 1 to cover an upward side and a rearward side of the cabin 7 is closed and a roof-open state (see FIG. 1B) where the openable roof 1 is folded and opened.

As shown in FIG. 1A, a trunk room 4 is provided at a rear portion of the vehicle-body main body 11, and an opening which is formed above the trunk room 4 is covered with a trunk lid 5. A storing compartment 2 where the openable roof 1 is stored is provided between the cabin 7 and the trunk room 4, which is configured to open upward.

A deck cover 10 to openably cover an upper-end opening 2a (see FIG. 1A) which is formed at an upper end of the storing compartment 2 is arranged above the storing compartment 2. The deck cover 10 is, as shown in FIGS. 1A and 1B, configured to have a closed position (regular position)

where it covers over the upper-end opening 2a of the storing compartment 2 when the openable roof 1 is positioned in the closed state or in the open state, and also have an open position (see the deck cover 10 illustrated by an imaginary line in FIG. 2) where it rises rearward and upward relative to the storing compartment 2, independently from the openable roof 1, so as to open (not to cover) the upper-end opening 2a of the storing compartment 2 when the openable roof 1 is changed between the closed state and the open state.

Further, as shown in FIGS. 1A and 1B, a B pillar 4 (center pillar 4) is provided slightly in back of a rear end of a door glass 3a of a side door 3, rising upward from the vehicle-body main body 11 beyond an upper-end side portion 134u of a rear fender 134. Herein, the B pillar 4 is configured to contact a front end of each side, in the vehicle width direction, of the deck cover 10 having the closed position from the inward side in the vehicle width direction.

The openable roof 1 is, as shown in FIGS. 1A and 1B, configured to be continuous from a front header 8 which is a strength member extending in the vehicle width direction and supporting an upper side of a front window glass 5 (front window member) provided at a front position of the cabin 7 and to form the upward side and the rearward side of the cabin 7. Specifically, the openable roof 1 comprises center roofs 1A, 1B which constitute a ceiling of the cabin 7 and a rear roof 1C which is provided at a rearward side of the cabin 7, which are arranged in order in the longitudinal direction. These roofs 1A, 1B, 1C are made of a hard roof member, respectively.

The center roofs 1A, 1B comprise the center roof body portion 1A and the center roof rear portion 1B which is arranged behind the center roof body portion 1A, which are pivotally connected to each other via respective facing parts.

Figure 4:
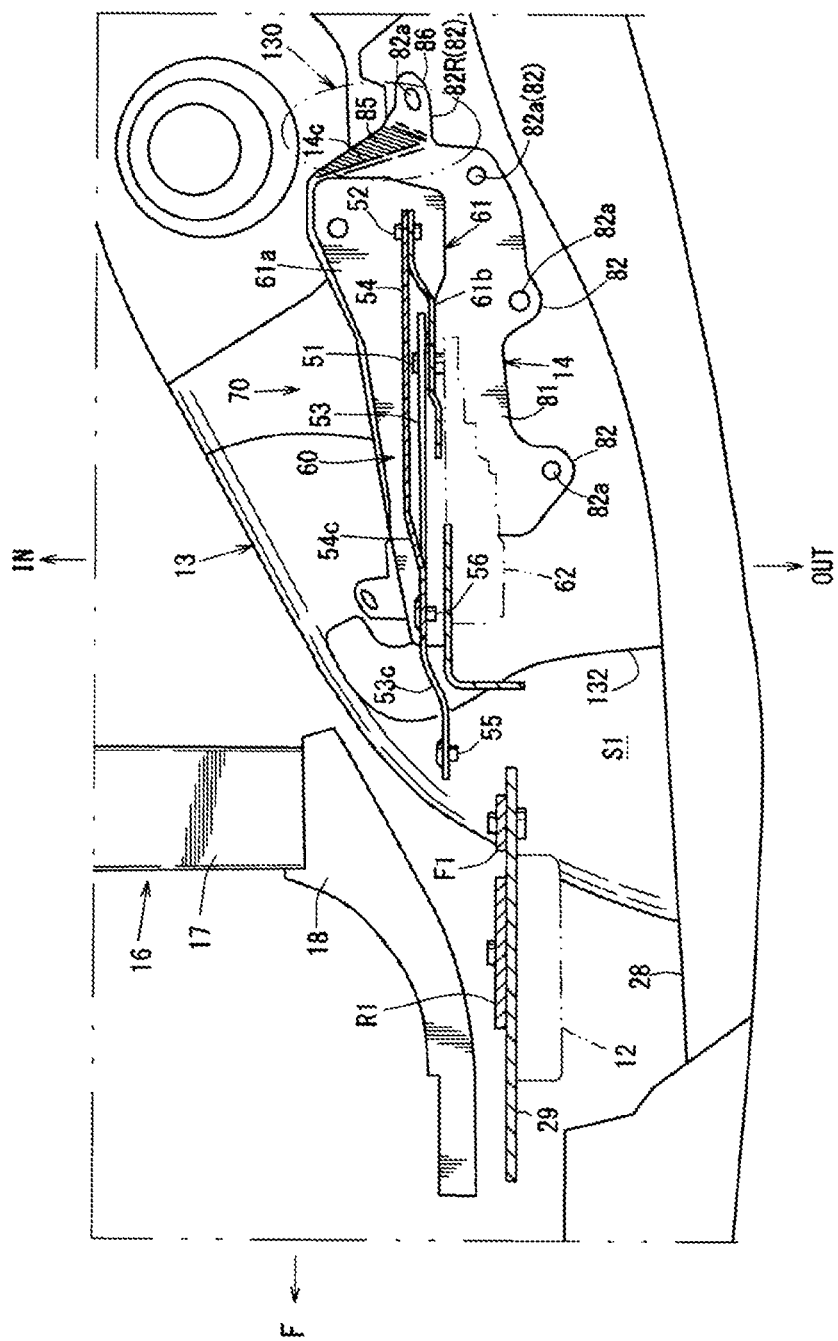
FIG. 4 is a plan view showing the rear vehicle-body structure of the automotive vehicle.

The openable roof 1 is configured to operate between the closed state and the open state by means of a drive unit 12 and a link mechanism to transmit a drive of the drive unit 12 to the openable roof 1 (see FIG. 4).

Herein, the link mechanism for the openable roof 1 is composed of plural links which are pivotally connected to each other at their end portions so as to operate interconnectedly, and is provided to interconnect a bracket 29 provided at a vehicle-body side and brackets (not illustrated) which are attached to respective bottom portions of the center roof body portion 1A, the center roof rear portion 1B, and the rear roof 1C (see FIG. 4). In FIG. 4, reference characters R1, F1 denote links which are provided on the side of the bracket 29.

Thus, the openable roof 1 is configured such that three split members of the center roof body portion 1A, the center roof rear portion 1B, and the rear roof 1C are foldable and storable in the storing compartment 2 (see FIG. 1B).

Further, as shown in FIGS. 1A and 1B, the above-described deck cover 10 constitutes a vehicle-body member provided between the cabin 7 and the trunk room 4, a front-side portion of which is configured to protrude upward so as to form an exterior-appearance surface of a rear side of the vehicle-body main body 11 when the deck cover is closed, and which comprises protrusion portions 22, 22 which are positioned on both sides in the vehicle width direction and a deck cover header 23 which is provided to extend in the vehicle width direction between the protrusion protrusions 22, 22.

The protrusion portion 22 protrudes upward such that its front end reaches substantially the same level (height) as the deck cover head 23 and also extends obliquely downward and rearward up to an front portion of the trunk room 4 such that its rear end reaches substantially the same level (height) as an upper face of the trunk lid 5.

The deck cover 10 is formed by the above-described pair of protrusion portions 22, 22 and the deck cover header 23 such that a rear-side portion of the cabin 7 of the vehicle-body main body 11 is formed in a gate shape in a front view. As shown in FIG. 1A, at a rear-side portion of the deck cover 10 is formed a rear-roof arrangement opening portion 24 which opens rearward in a roughly rectangular shape in the front view such that an inside of the cabin 7 and an outside of the cabin 7 are connected therethrough, where the rear roof 1C is detachably provided.

Figure 2:
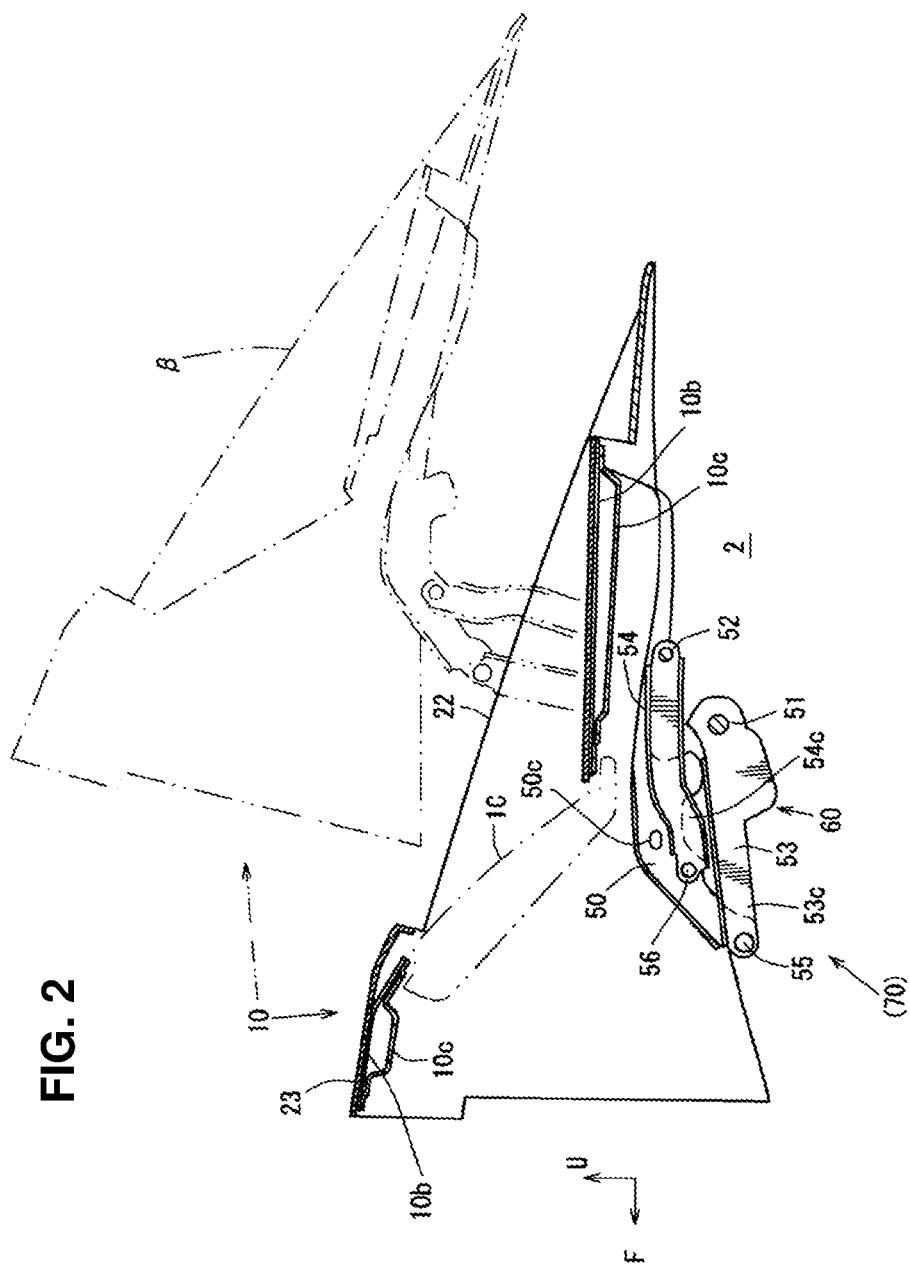
FIG. 2 is a side view showing a support structure of a deck cover.
Figure 3:
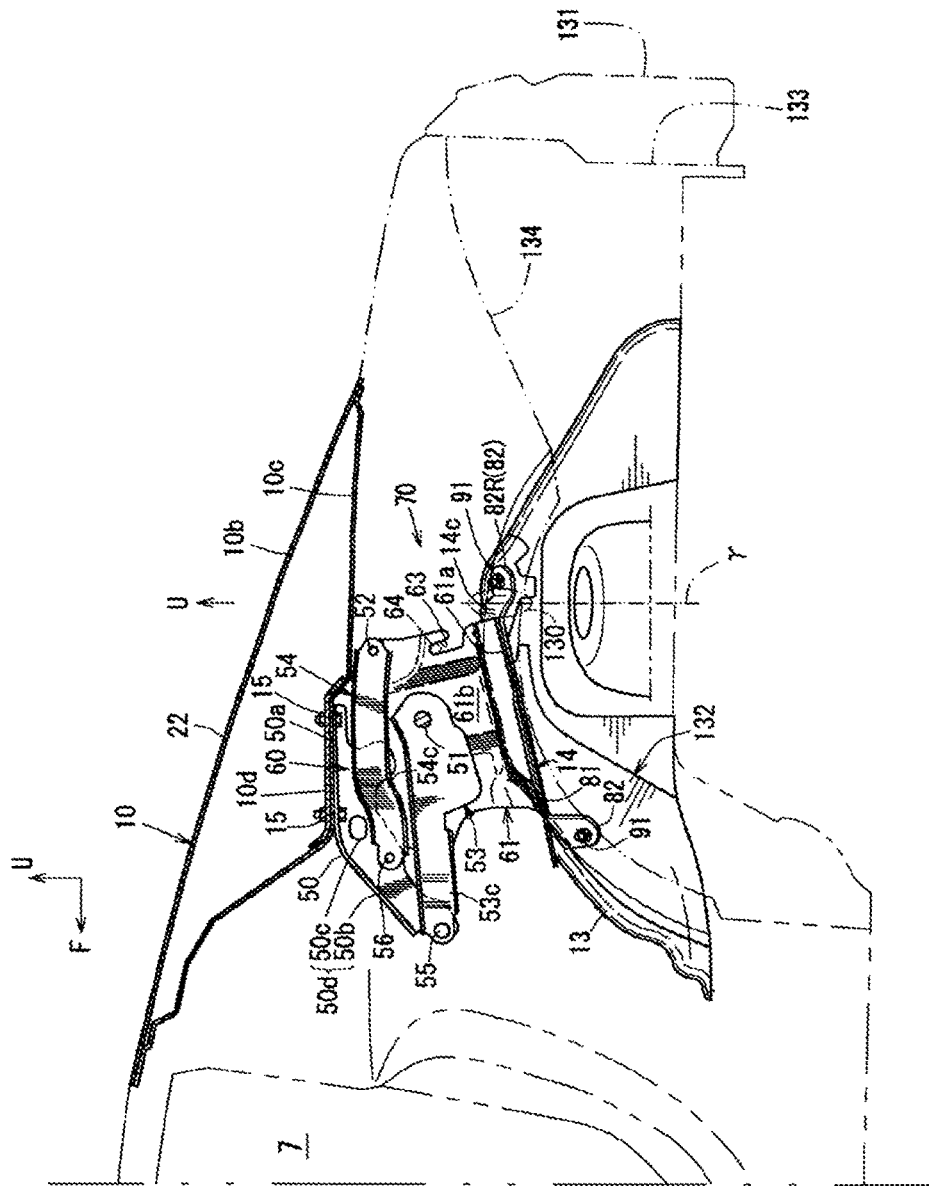
FIG. 3 is a side view showing the support structure of the deck cover for a vehicle body.
Figure 5:
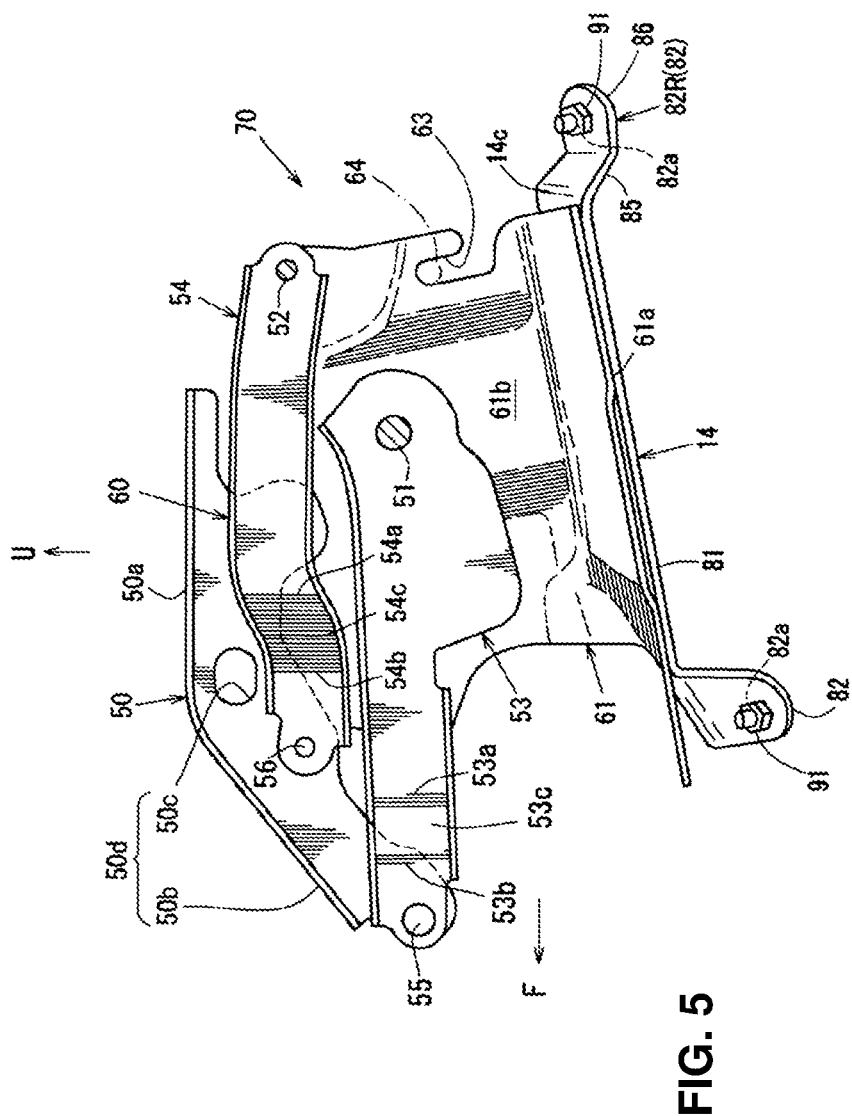
FIG. 5 is an enlarged plan view of a major part of FIG. 3.
Figure 6:
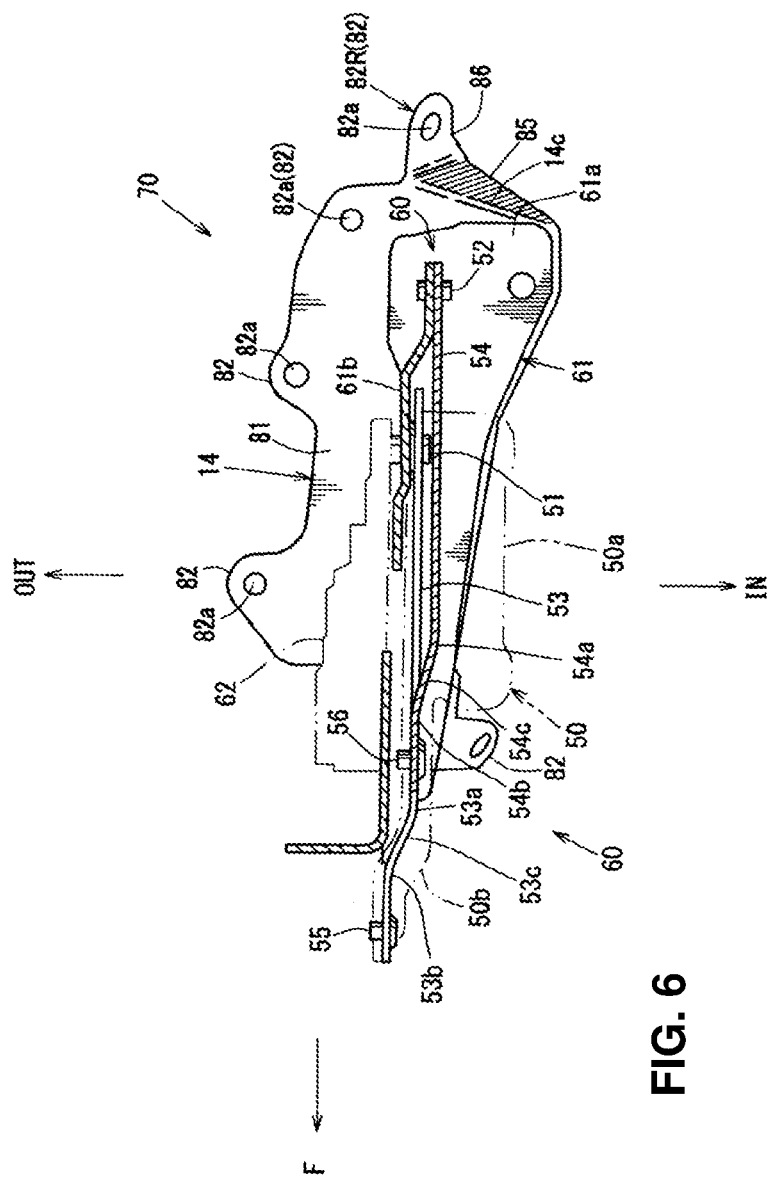
FIG. 6 is an enlarged plan view of a major part of FIG. 4.

FIG. 2 is a side view showing the support structure of the deck cover as the rear openable body, when viewed from the inward side, FIG. 3 is a side view showing the support structure of the deck cover for the vehicle body of the deck cover, when viewed from the inward side, FIG. 4 is a plan view showing a left side of the rear vehicle-body structure of the automotive vehicle, FIG. 5 is an enlarged plan view of a major part of FIG. 3, and FIG. 6 is an enlarged plan view of a major part of FIG. 4. In FIG. 3, reference character 131 denotes a rear bumper which extends in the vehicle width direction as a damper of the vehicle-body rear portion, reference character 133 denotes a rear end panel which constitutes a rear end of the trunk room 4, and these two members are poisoned at a vehicle-body rear end portion.

As shown in FIG. 2, the deck cover 10 comprises an upper panel 10b and a lower panel 10c, which form together a frame of the deck cover 10. The deck cover 10 is provided with a deck-cover support bracket 50 (hereafter, referred to as the bracket 50 simply) at its lower portion.

Further, as shown in FIGS. 3 and 4, a lower bracket 14 and an upper bracket 61 are attached to an upper portion of a rear wheelhouse 13. This upper bracket 61 is provided with two base-end axes 51, 52 which are spaced apart from each other in the vehicle longitudinal direction, and links 53, 54 which constitute a parallel link are attached to these base-end axes 51, 52, respectively.

A front end portion of the lower-side link 53 of a driving side is pivotally connected to the bracket 50 via a pin 55 right below the bracket 50, and a front end portion of the upper-side link 54 of a driven side is pivotally connected to a lower portion of a middle part, in the longitudinal direction, of the bracket 50 via a pin 56. The above-described base end axis 51 is forwardly/reversely driven by a special drive motor for the deck cover 10 which is different from a drive motor provided at the drive unit 12 (see FIG. 4) for the openable roof 1.

When the drive motor rotates forwardly, the both links 53, 54 of the parallel link are driven upward (clockwise in FIG. 2), so that the deck cover 10 is elevated upward and rearward via the bracket 50 as shown by an imaginary line β in FIG. 2. Thereby, the deck cover 10 is opened to a non-interference position where the deck cover 10 does not interfere with the center roofs 1A, 1B and the rear roof 1C when these roofs 1A, 1B, 1C are opened or closed.

That is, the deck cover 10 as the rear openable body is provided with, as a support structure 70 to support the deck cover 10, the bracket 50, the lower bracket 14 (attaching bracket), the upper bracket 61 (base bracket), and a four-joint ink mechanism 60 (including the links 53, 54). Herein, the rear wheelhouse 13 is formed in an arch shape, in a side view, such that a middle portion, in the longitudinal direction, thereof protrudes upward for covering a rotatable rear wheel, and a top portion 130 (upper end portion) of the rear wheelhouse 13 is configured as an upward-displacement portion to be displaced (deformed) upward relative to the rear bumper 131 when the vehicle-body rear portion including the rear wheelhouse 13 is deformed in the vehicle rear collision.

The above-described support structure 70 of the deck cover 10 is configured such that the deck cover 10 is supported in front of the top portion 130 (upward-displacement portion) of the rear wheelhouse 13 thereby.

Further, each of the above-described links 53, 54 is configured to support the deck cover 10 having the closed position at or in the vicinity of a lower limit position (a rotational limit position in a counterclockwise direction) where the bracket 50 does not lower any more in each operational range of the links 53, 54 (see FIGS. 2 and 3).

Thereby, when the deck cover 10 is pushed up by the support structure 70 which is caused by the deformation of the vehicle-body rear portion in the vehicle rear collision, this pushing-up energy is not absorbed by the counterclockwise rotation of the links 53, 54. Herein, the above-described vicinity of the lower limit position means a range within 10% from the lower limit position relative to each rotational range of the links 53, 54, for example.

As shown in FIGS. 5 and 6, the lower bracket 14 is a base of the upper bracket 61, and comprises a base plate 81 which extends substantially horizontally so as to support an attachment seat 61a of the upper bracket 61 thereon and attachment portions 82 including attachment holes 82a which are formed at a periphery of the base plate 81 and respective positions spaced apart from each other in the longitudinal direction and in the vehicle width direction. The base plate 81 and the attachment portions 82 are formed integrally.

Herein, as shown in FIGS. 3 and 4, a plate-shaped reinforcement 132 is provided at a position of the rear wheelhouse 13 which corresponds to the lower bracket 14 along an upper face of the rear wheelhouse 13. As shown in FIG. 3, the above-described attachment portion 82 including the attachment holes 82a, the rear wheelhouse 13, and the reinforcement 132 are fixedly fastened together by fastening members 91, such as bolts and nuts. Herein, illustration of the fastening member 91 is omitted in FIGS. 4, 6 and 7, respectively.

As shown in FIGS. 3-6, the attachment portion 82 which is provided at the rear end of the lower bracket 14 and on the inward side in the vehicle width direction is constituted as a rear-side attachment leg portion 82R which extends toward the upper face of the rear wheelhouse 13. This rear-side attachment leg portion 82R comprises, as shown in FIGS. 5 and 6, an extension portion 85 which extends obliquely rearward and downward from a rear end of the base plate 81 and a flange portion 86 which extends from a rear lower end of the extension portion 85 so as to contact an attachment position of the reinforcement 132 and has the attachment hole 82a, which are formed integrally.

At a base end portion of the extension portion 85 is provided a rear-side bent portion 14c which is formed by the base plate 81 and the extension portion 85. This bent portion 14c is configured to be bent in a bridge shape (inverse V shape) in the side view.

The rear-side attachment leg portion 82R is attached to the upper face of the rear wheelhouse 13 so as to be positioned at the top portion 130 of the rear wheelhouse 13 (see FIGS. 3 and 4). Specifically, in the present embodiment, the rear-side attachment leg portion 82R is attached to a specified position such that the rear-side bent portion 14c is located right above the top portion 130 of the rear wheelhouse 13, that is, the longitudinal position of the rear-side bent portion 14c matches the longitudinal position of the top portion 130 (see a line γ illustrated by an imaginary line in FIG. 3).

Further, as shown in FIGS. 3-6, the upper bracket 61 comprises an attachment seat 61a which is positioned at a lower portion of the upper bracket 61 and a vertical wall 61b which rises from the attachment seat 61a, which are formed integrally, and the links 53, 54 are attached to an inward side, in the vehicle width direction, of the vertical wall 61b via the base end axes 51, 52. Meanwhile, at an outward face in the vehicle width direction, of the vertical wall 61b is attached a drive unit 62 which comprises a motor and gears to forwardly/reversely drive the driving-side base-end axes 51.

Further, an engaging hook 63 for temporarily positioning the upper bracket 61 relative to the vehicle-body side is formed at a middle position, in the vertical direction, of a rear-end side of the vertical wall 61b (see FIGS. 3 and 5). This engaging hook 63 is formed in a slit shape such that it extends forward from the rear-end side of the vertical wall 61b in a cutout shape and further extends forward and upward along the rear-end side. Meanwhile, at a portion of an inner wall of a vehicle-body side face which corresponds to the above-described middle position is provided a pin 64 which protrudes inward, in the vehicle width direction, from the above-described portion so as to engage with an edge portion of the engaging hook 63.

A forming direction of a groove shape of the engaging hook 63 is set to be a direction which can allow the upper bracket 61 to have a forward-tilting position after engaging of the pin 64 with the engaging hook 63 is released in the vehicle rear collision from a state where the pin 64 engages with the engaging hook 63.

Thereby, when the rear wheelhouse 13 is deformed in the ridge-folding shape in the vehicle rear collision, the engaging of the pin 64 with the engaging hook 63 is allowed to be released, so that the upper bracket 61 comes to tilt forward, not staying at its temporarily-fixed position relative to the vehicle-body side. Accordingly, the ridge-folding shaped deformation of the rear wheelhouse 13 can be promoted.

As shown in FIG. 3, the bracket 50 supporting the deck covet 10 comprises a roughly-horizontal deck-cover attachment portion 50a, an extension portion 50b which extends obliquely forward and downward from a front end of the attachment portion 50a, and an through opening 50c (a so-called hole portion) which is formed at the front end of the attachment portion 50a, and both the opening 50c and the above-described extension portion 50b constitute a bending promotion portion 50d.

Herein, as shown in FIG. 3, a reinforcement 10d is provided along an upper face of the lower panel 10c at a specified position of the deck cover 10 which corresponds to the attachment portion 50a of the bracket 50, and the deck-cover attachment portion 50a, the lower panel 10c, and the reinforcement 10d are fixed together by fastening members 15, 15, such as bolt and nut.

The above-described bending promotion portion 50d is a longitudinal-load weak portion which is intentionally configured to be weak in the longitudinal direction compared to its surrounding portion, so that bending of the bracket 50 in the outward direction and in the upward direction can be promoted when the vehicle-body rear portion is deformed in the vehicle rear collision.

As shown in FIGS. 5 and 6, at a front portion of the lower link 53 of the link mechanism 60 is formed bending points 53a, 53b which are spaced apart from each other in the longitudinal direction, a bent portion 53c which is bent obliquely outward and forward from the rear-side bending point 53a toward the front-side bending point 53b is formed integrally, and this bent portion 53c is a bending promotion portion which promotes the outward bending of the link 53 when the vehicle-body rear portion is deformed in the vehicle rear collision.

Likewise, as shown in FIGS. 5 and 6, at a front portion of the upper link 54 of the link mechanism 60 is formed bending points 54a, 54b which are spaced apart from each other in the longitudinal direction, a bent portion 54c which is bent obliquely outward and forward from the rear-side bending point 54a toward the front-side bending point 54b is formed integrally, and this bent portion 54c is a bending promotion portion which promotes the outward bending of the link 54 when the vehicle-body rear portion is deformed in the vehicle rear collision. The above-described bent portions 53c, 54c allow longitudinally-relative displacement between the deck cover 10 of the rear openable body and the upper bracket 61 of the vehicle-body attachment portion.

Further, the support structure 70 of the deck cover 10 compatibly attain reinforcing of surroundings of an attachment point of the rear wheelhouse 13 where the support structure 70 is attached, load dispersibility, and attaching workability of the support structure 70 to the rear wheelhouse 13 by attaching the upper bracket 61 to the reinforcement 132 via the lower bracket 14, not to the reinforcement 132 directly attached to the upper face of the rear wheelhouse 13.

Herein, as shown in FIG. 4, at the front side of the link mechanism 60 comprising the links 53, 54 are provided the first link F1 and the vertical link R1 which are other links than the links 53, 54 and a seatback cross member 16 (cross bar member) as a vehicle-body rigidity member.

The above-described seatback cross member 16 is a cross bar member which is positioned in back of a seatback of a seat (not illustrated), and comprises a cross member body 17 which has a closed cross section extending in the vehicle width direction and connecting members 18 which connect right-and-left both end portions (a left-side end portion is illustrated in FIG. 4 only) of the cross member body 17 to the vehicle body. Right-and-left both portions of the cross member body 17 are connected to a rear floor via pillar members, not illustrated.

As shown in FIG. 4, the link mechanism 60 of the deck cover 10 is positioned in back of the seatback cross member 16, and provided such that it overlaps the connecting members 18 of the seatback cross member 16 in the vehicle width direction. Meanwhile, the first link F1 and the vertical link R1 are positioned on the outward side, in the vehicle width direction, of the connecting member 18, whereby a vehicle-design requirement is satisfied.

As shown in FIG. 4, a member-retreat space S1 for the vehicle rear collision is creased between a rear portion of the bracket 29 pivotally supporting the links F1, R1 and the body side portion 28, and between a front portion of the link mechanism 60 comprising the links 53, 54 and the body side portion 28.

Figure 8:
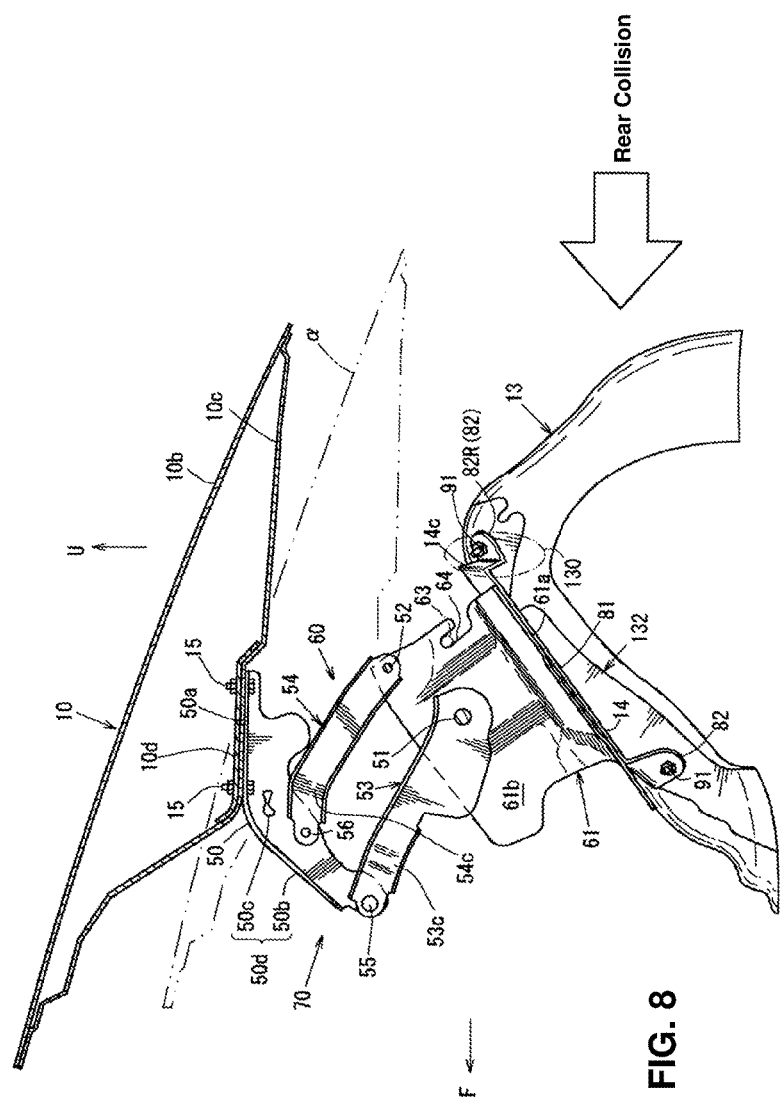
FIG. 8 is a side view showing the state in the vehicle rear collision.

Hereafter, an operation of the rear vehicle-body structure of the open car V described above will be described. As the vehicle-body rear portion is deformed due to the vehicle rear collision from a normal state shown in FIGS. 3 and 4, the rear wheelhouse 13 is deformed in the ridge-folding shape as shown in FIG. 8, so that the rear wheelhouse 13 is compressed in the longitudinal direction.

In the present embodiment, the deck cover 10 is configured to be supported by the support structure 70 which is attached to the portion of the rear wheelhouse 13 which is located in front of the top portion 130.

Accordingly, when the rear wheelhouse 3 is deformed in the vehicle rear collision, a force to displace the deck cover 10 upward is applied to the deck cover 10 and also a moment to tilt the deck cover 10 forward, i.e., a moment to tilt the deck cover 10 such that its rear end is elevated, is applied to the deck cover 10 by way of the support structure 70, so that the collision object coming in toward the vehicle-body rear portion can be avoided promptly.

Additionally, the rear-side bent portion 14c provided at the rear end of the lower bracket 14 is arranged in the vicinity of the top portion 130 of the rear wheelhouse 13, so that this rear-side bent portion 14c becomes a bending starting point in the vehicle rear collision, thereby further promoting the upward deformation of the top portion 130 of the rear wheelhouse 13.

Thereby, the deck cover 10 can receive a larger moment to displace the deck cover 10 such that its rear end is elevated from the rear wheelhouse 13 by way of the support structure 70, thereby avoiding the collision object more promptly.

Further, even if the deck cover 10 is pressed from behind via the support structure 70 in a state where the upper bracket 61 leans forward, its forward move is restricted by the openable roof 1, the B pillars 4, 4 provided at the bod sides in the vehicle width direction, and others, so that the deck cover 10 is displaced upward or outward relative to the cabin 7, without coming into the cabin 7.

Figure 7:
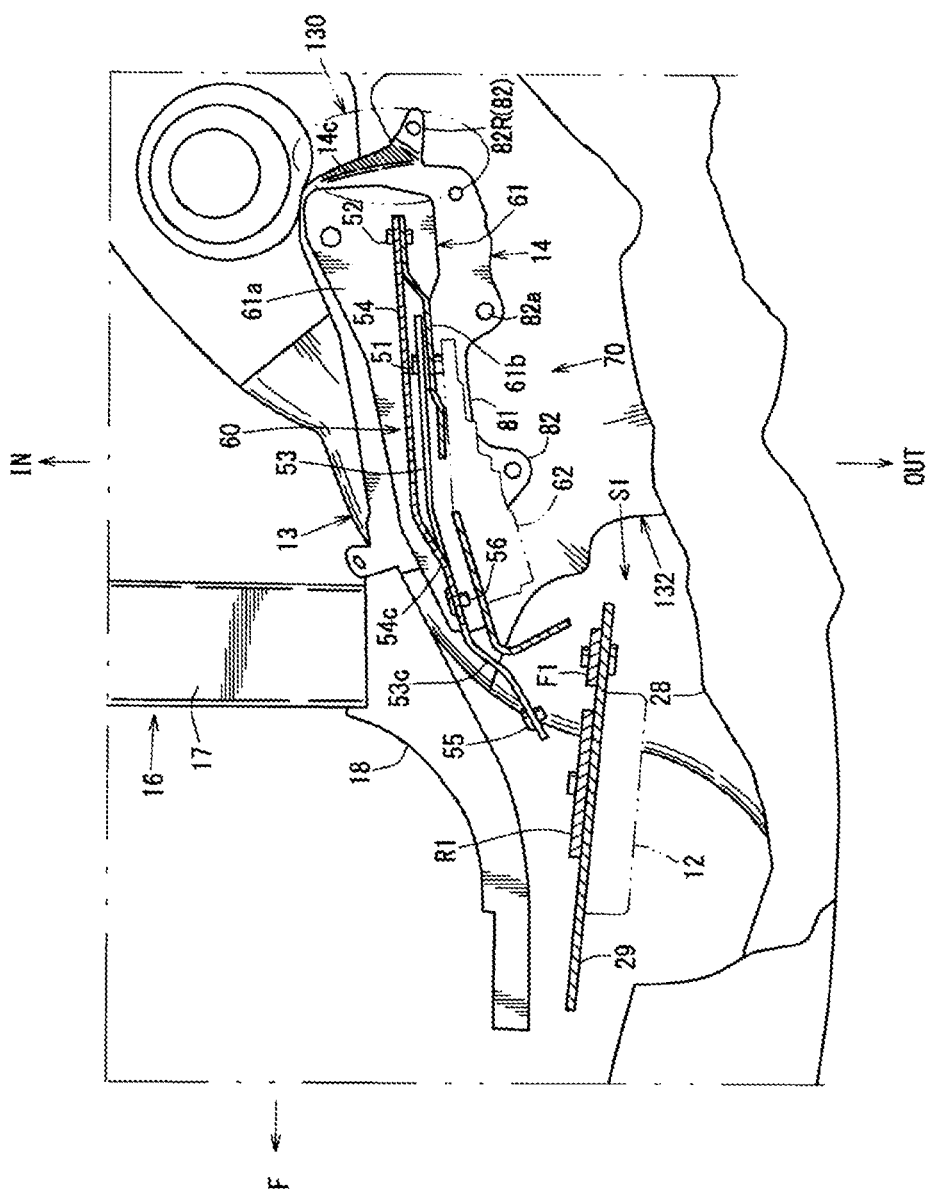
FIG. 7 is a plan view showing a state in a vehicle rear collision.

Herein, the support structure 70 is configured to allow the deck cover 10 to be displaced relatively to the rear wheelhouse 13 which is deformed in the ridge-folding shape in the vehicle rear collision through the outward bending of the bent portions 53c, 54c and the bending deformation of the bending promotion portion 50d as shown in FIG. 7.

Accordingly, the lower link 53 and the upper link 54 of the support structure 70 are not broken, and the linkage of the bracket 50 with the upper bracket 61 through the pins 55, 56 and the base end axes 51, 52 can be maintained. Thereby, the deck cover 10 having a relatively heavy weight is prevented from being displaced forward toward the cabin 7 too much and also prevented from being separated from the support structure 70, so that the deck cover 10 can be kept in its state of being properly supported at the support structure 70.

Moreover, as shown in FIG. 7, even if the links 53, 54 have the forward-and-outward bending deformation, the front portions of the links 53, 54 retreat toward the member-retreat space S1, without interfering with the seatback cross member 16.

Herein, since the front end portions of the links 53, 54 are connected to the bending promotion portion 50d via the pins 55, 56, the load absorption can be promoted more by the bending of the bending promotion portion 50d. In FIG. 8, the state where the deck cover 10 has been moved upward is shown by a solid line and the state of the deck cover 10 before the rear collision is shown by an imaginary line α.

The bending promotion portion 50d of the bracket 50 extends forward and downward, so that the amount of allowed relative displacement (displacement amount) can be increased. Further, the opening 50c as a service hole is formed at the base portion of the bending promotion portion 50d within a rear range of securing the necessary rigidity for a normal condition so that the stress of the collision load can be concentrated on this service hole 50c, so that the deformation can be controlled. Herein, this portion of the bracket 50 may be configured to be thinner so as to provide a low rigidity portion in place of the service hole 50c.

While the other links and the seatback cross member 6 as the vehicle-body rigidity member are provided in front of the link mechanism 60, the above-described member-retreat space S1 is formed on the outward side, in the vehicle width direction, of these members, so that any interference of the front portion of the link mechanism 60 with the other links or the seatback cross member 16 can be avoided.

Herein, it is preferable that the above-described deck cover 10 be mounted on the vehicle body and the deck member 10 be supported at the vehicle body by means of the positioning strength by the links 53, 54 and the own weight of the deck cover 10. Thereby, the deck cover 10 can be smoothly allowed to escape upward, thereby increasing the allowed longitudinal-relative displacement amount.

The above-described rear vehicle-body structure of the open car V comprises the deck cover 10 as the rear openable body openably provided at the vehicle-body rear portion positioned in back of the cabin 7, and the top portion 130 as the upward-displacement portion provided at the vehicle-body rear portion, the top portion 130 being configured to be displaced upward, relative to the rear bumper 131 and the rear end panel 133 as the vehicle-body rear end portion, by the vehicle-body deformation caused by the vehicle rear collision, wherein the deck cover 10 is supported at the position of the vehicle-body rear portion which is located vertically above (right above) or in front of the top portion 130 such that the deck cover 10 is elevated in accordance with upward displacement of the top portion 130 when the vehicle-body rear portion receives the rear-collision load (see FIG. 3).

According to the above-described structure, the direct interference of the deck cover 10 with the collision object can be prevented by the simple structure.

Specifically, as described above, the rear vehicle-body structure of the open car V of the present embodiment is configured such that the deck cover 10 is supported by the support structure 70 which is attached to the portion of the rear wheelhouse 13 which is located in front of the top portion 130 provided at the vehicle-body rear portion. That is, the deck cover 10 is supported by the support structure 70 which is attached to the specified position such that the support structure 70 tilts forward in accordance with the upward displacement of the top portion 130 due to the deformation of the vehicle-body rear portion in the vehicle rear collision.

Thereby, the deck cover 10 can be displaced such that its rear portion is elevated, without being displaced such that its rear portion lowers, that is, such that its rear portion is displaced toward the collision object coming in the vehicle body from behind.

Accordingly, the direct interference of the deck cover 10 with the collision object can be prevented.

Further, according to the rear vehicle-body structure of the open car V of the present embodiment, since the direct interference of the deck cover 10 with the collision object coming into the vehicle-body rear portion in the vehicle rear collision is avoided, it is unnecessary to reinforce the link mechanism 60 supporting the deck cover 10 unlike a case in which the deck cover 10 is arranged at a higher level, for example, so that the deck cover 10 can be supported stably. Additionally, since there is no need to increase the vehicle-body weight or an arrangement space, the direct interference of the deck cover 10 with the collision object can be prevented with the simple structure.

Moreover, since the rear portion of the deck cover 10 is displaced upward by utilizing the deformation of the vehicle-body rear portion due to the vehicle rear collision, without using the drive of the motor of the drive unit 12 for quickly elevating the deck cover 10 up to a higher position to avoid the interfere with the collision object, the interference of the deck cover 10 with the collision object can be avoided with the simple structure not necessarily comprising the large-sized and expensive drive unit 12.

In the embodiment of the present invention, the upward-displacement portion is configured as the top portion 130 of the rear wheelhouse 13, and the deck cover 10 is supported at the portion which is located in front of the top portion 130 of the rear wheelhouse 13 (see FIG. 3).

Herein, the above-described portion of the rear wheelhouse 13 which is located in front of the top portion 130 of the rear wheelhouse 13 is the portion which is made to tilt forward in accordance with the upward displacement of the top portion 130 of the rear wheelhouse 13 in the vehicle rear collision. According to the above-described structure, the deck cover 10 is supported by the support structure 70 at the portion of the rear wheelhouse 13 which is located in front of the top portion 130 of the rear wheelhouse 13. Thereby, the moment to make the deck cover 10 tilt forward, i.e., the movement to elevate the rear end of the deck cover 10, can be applied to the deck cover 10 through the support structure 70 in accordance with the upward displacement of the top portion 130 of the rear wheelhouse 13 in the vehicle rear collision, thereby securely avoiding the interference of the deck cover 10 with the collision object coming in from behind in the vehicle rear collision.

Further, in the embodiment of the present invention, the link mechanism 60 to openably support the deck cover 10 at the vehicle-body rear portion is provided at the support structure 70 to support the deck cover 10, and the support structure 70 has the rear-side bent portion 14c as the bending promotion portion to promote the upward displacement of the top portion 130 of the rear wheelhouse 13 at its base portion (see FIGS. 3-8).

According to the above-described structure, the support structure 70 which receives the upward load from the rear wheelhouse 13 which is deformed in the ridge-folding shape in the vehicle rear collision stays at its arrangement position so as not to block the upward displacement of the top portion 130 of the rear wheelhouse 13 because the rear-side bent portion 14c provided at the lower bracket 14 which the support structure 70 has at its base portion becomes the bending point, so that the elevation load of the deck cover 10 which receives from the rear wheelhouse 13 deformed in the ridge-folding shape in the vehicle rear collision can be increased.

In particular, in the present embodiment, since the rear-side bent portion 14c is located vertically above the top portion 130 of the rear wheelhouse 13, the upward deformation of the top portion 130 of the rear wheelhouse 13 can be further caused in the vehicle rear collision.

Moreover, in the embodiment of the present invention, the link mechanism 60 to openably support the deck cover 10 at the vehicle-body rear portion is provided at the support structure 70 to support the deck cover 10, and the support structure 70 has the bent portions 53c, 54c as the easily-bending deformation portion and the bending promotion portion 50d (see FIGS. 5 and 6).

According to this structure, forward displacement of the deck cover 10 or any break (unpredictable bending, cracking, shearing or the like) of the links 53, 54 which is caused by the interference with the collision object can be suppressed, so that the deck cover 10 can be elevated smoothly.

Specifically, since the rear-side bent portion 14c is bent and deformed in the vehicle rear collision, the support structure 70 absorbs the load applied to the deck cover 10, so that the support structure 70 can allow the relative displacement of the deck cover 10 relative to the rear wheelhouse 13 which is deformed in the ridge-folding shape.

Thereby, it can be suppressed that the deck cover 10 is displaced forward too much, and the deck cover 10 can be elevated smoothly without separating the deck cover 10 from the support structure 70 in the vehicle rear collision.

Moreover, in the embodiment of the present invention, the link mechanism 60 to openably support the deck cover 10 at the vehicle-body rear portion is provided, and the link mechanism 60 is configured to support the deck cover 10 which is positioned in the closed state at or in the vicinity of the lower limit position in the structurally-operational range of the link mechanism 60 (see FIGS. 2 and 3).

According to this structure, the deck cover 10 can be securely elevated regardless of the support rigidity of the deck cover 10 at a middle position in the operational range of the link mechanism 60, so that the collision object can be avoided properly.

In correspondence between the present invention and the above-described embodiment, the automotive vehicle with the storing-type roof of the present invention corresponds to the open car V of the embodiment. Likewise, the rear openable body corresponds to the deck cover 10, the upward-easily-bending portion or the wheelhouse corresponds to the rear wheelhouse 13, the vehicle-body rear end portion corresponds to the rear bumper 131 or the rear end panel 133, the base portion of the link mechanism corresponds to the lower bracket 14, the bending promotion portion corresponds to the rear-side bent portion 14c, and the easily-bending deformation portion corresponds to the bent portions 53c, 54c. However, the present invention should not be limited to the structure of the above-described embodiment.

For example, while the deck cover 10 of the present embodiment is configured to be supported by the support structure 70 which is attached to the portion of the rear wheelhouse 13 provided at the vehicle-body rear portion which is located in front of the top portion 130 as the upward-displacement portion, the deck cover 10 may be supported by the support structure 70 which is attached to a position located right above the top portion 130 of the rear wheelhouse 13 as long as the deck cover 10 is supported by the support structure 70 which is attached to a portion of the rear wheelhouse 13 which is not located in back of the top portion 130.

Further, the above-described upward-displacement portion is not limited to the top portion 130 of the wheelhouse 13, and any portion which is configured to be displaced upward due to the vehicle rear collision, such as a member to be pushed upward by contacting some member arranged in front when receiving the collision load, is applicable.

For example, in a case where a reinforcement extending in the longitudinal direction along a rear vehicle-body side wall and a link mechanism is attached to this reinforcement, some means for promoting the upward displacement which is caused by the vehicle rear collision, such as configuring the reinforcement in a bent shape in the side view or forming a bead at a lower face of the reinforcement, may be used as the upward-easily-bending portion.

Further, an attachment portion of the link mechanism may be configured to be displaced upward in a trapezoidal shape by forming two upward-bent top portions which are located in front and back of the link mechanism in place of forming the above-described single top portion.

Moreover, while the deck cover 10 is exemplified as the rear openable body in the above-described embodiment, a rear roof may be applied. Also, a bulkhead which partitions the cabin from a baggage room may be used as the vehicle-body rigid member which is located in front of the links in place of the seat cross member 16.

What is claimed is:

1. A rear vehicle-body structure of an automotive vehicle with a storing-type roof, comprising:
a rear openable body openably provided at a vehicle-body rear portion positioned in back of a cabin; and
an upward-displacement portion provided at the vehicle-body rear portion, the upward-displacement portion being configured to be displaced upward, relative to a vehicle-body rear end portion, by vehicle-body deformation caused by a vehicle rear collision,
wherein said rear openable body is supported at a position of the vehicle-body rear portion which is located vertically above or in front of said upward-displacement portion such that the rear openable body is elevated in accordance with upward displacement of said upward-displacement portion when the vehicle-body rear portion receives a rear-collision load.

2. The rear vehicle-body structure of the automotive vehicle with the storing-type roof of claim 1, wherein said upward-displacement portion is configured as a top portion of an upward-easily-bending portion, and said rear openable body is supported at a portion which is located in front of the top portion of said upward-easily-bending portion.

3. The rear vehicle-body structure of the automotive vehicle with the storing-type roof of claim 2, wherein said upward-displacement portion is configured as a top portion of a wheelhouse.

4. The rear vehicle-body structure of the automotive vehicle with the storing-type roof of claim 3, wherein a link mechanism to openably support said rear openable body at the vehicle-body rear portion is provided, and said link mechanism has a bending promotion portion to promote the upward displacement of said upward-displacement portion at a base portion thereof.

5. The rear vehicle-body structure of the automotive vehicle with the storing-type roof of claim 3, wherein a link mechanism to openably support said rear openable body at the vehicle-body rear portion is provided, and said link mechanism has a easily-bending deformation portion to promote bending deformation for a longitudinal load.

6. The rear vehicle-body structure of the automotive vehicle with the storing-type roof of claim 3, wherein a link mechanism to openably support said rear openable body at the vehicle-body rear portion is provided, and said link mechanism is configured to support the rear openable body which is positioned in a closed state at or in the vicinity of a lower limit position in a structurally-operational range of the link mechanism.

7. The rear vehicle-body structure of the automotive vehicle with the storing-type roof of claim 4, wherein said rear openable body is provided to be elevated as a whole when being opened.

8. The rear vehicle-body structure of the automotive vehicle with the storing-type roof of claim 5, wherein said rear openable body is provided to be elevated as a whole when being opened.

9. The rear vehicle-body structure of the automotive vehicle with the storing-type roof of claim 6, wherein said rear openable body is provided to be elevated as a whole when being opened.

10. The rear vehicle-body structure of the automotive vehicle with the storing-type roof of claim 1, wherein said upward-displacement portion is configured as a top portion of a wheelhouse.

11. The rear vehicle-body structure of the automotive vehicle with the storing-type roof of claim 1, wherein a link mechanism to openably support said rear openable body at the vehicle-body rear portion is provided, and said link mechanism has a bending promotion portion to promote the upward displacement of said upward-displacement portion at a base portion thereof.

12. The rear vehicle-body structure of the automotive vehicle with the storing-type roof of claim 1, wherein a link mechanism to openably support said rear openable body at the vehicle-body rear portion is provided, and said link mechanism has a easily-bending deformation portion to promote bending deformation for a longitudinal load.

13. The rear vehicle-body structure of the automotive vehicle with the storing-type roof of claim 1, wherein a link mechanism to openably support said rear openable body at the vehicle-body rear portion is provided, and said link mechanism is configured to support the rear openable body which is positioned in a closed state at or in the vicinity of a lower limit position in a structurally-operational range of the link mechanism.

14. The rear vehicle-body structure of the automotive vehicle with the storing-type roof of claim 1, wherein said rear openable body is provided to be elevated as a whole when being opened.

* * * * *